United States Patent
Klein et al.

[19]

[11] Patent Number: 5,865,497
[45] Date of Patent: Feb. 2, 1999

[54] PNEUMATIC STRUT FOR A MOTOR VECHICLE

[75] Inventors: Alfred K. Klein, Weitersburg; Peter Thurmann, Waldesch, both of Germany

[73] Assignee: Stabilus GmbH, Koblenz

[21] Appl. No.: 759,320

[22] Filed: Dec. 2, 1996

[30] Foreign Application Priority Data

Nov. 30, 1995 [DE] Germany ................. 195 44 590.2

[51] Int. Cl.$^6$ ................................... F16C 11/06
[52] U.S. Cl. .................... 296/146.8; 296/37.16; 292/338
[58] Field of Search ............... 296/37.1, 37.16, 296/56, 106, 146.8; 292/338

[56] References Cited

U.S. PATENT DOCUMENTS

| | | | |
|---|---|---|---|
| 3,181,911 | 5/1965 | Peras | 296/106 X |
| 4,118,131 | 10/1978 | Schnitzius | 296/56 X |
| 4,222,600 | 9/1980 | Cripps et al. | 296/37.16 X |
| 4,588,220 | 5/1986 | Matsui et al. | 292/338 |
| 4,648,648 | 3/1987 | Shigesada | 296/37.16 |
| 4,973,097 | 11/1990 | Hosan et al. | 292/338 X |

FOREIGN PATENT DOCUMENTS

| | | |
|---|---|---|
| 2256654 | 7/1975 | France . |
| 2565176 | 12/1985 | France . |
| 1294836 | 5/1969 | Germany . |
| 2332791 | 1/1975 | Germany . |
| 2345503 | 3/1975 | Germany . |
| 2457938 | 6/1976 | Germany . |
| 2954560 | 5/1980 | Germany . |

*Primary Examiner*—Dennis H. Pedder
*Attorney, Agent, or Firm*—Nils H. Ljungman and Associates

[57] ABSTRACT

Vehicle including a body component and an additional body part, particularly a hatch door, which is movably mounted on the body component. The hatch door can be mounted on a power-assisted pivoting axis by means of a pneumatic spring or strut hinged by connection elements to form a pneumatic spring assembly. The vehicle has a component, particularly a trunk compartment cover, which moves simultaneously with an hatch door by means of a connection. The connection is mounted between the component and the pneumatic spring assembly.

11 Claims, 7 Drawing Sheets

PNEUMATIC STRUT FOR A MOTOR VECHICLE

BACKGROUND OF THE INVENTION

1. Field of the Invention

The present invention relates generally to a pneumatic strut or pneumatic spring for a motor vehicle having a rear hatch door. The hatch door can be movably mounted on a body component of the motor vehicle. To aid in moving the hatch door about a pivoting axis, one or more pneumatic springs or pneumatic struts can be hinge-mounted by connection elements to form a pneumatic spring assembly between the hatch door and the body component. The pneumatic spring assembly can assist a user in moving the hatch door. The motor vehicle can have an additional component, typically a trunk deck or trunk compartment cover, that also moves, at least incrementally, simultaneously with the movement of the hatch door.

2. Background Information

A relatively large proportion of vehicles have a body component, such as a rear end section, to which an additional body component is attached. Particularly, the additional body component can be a vehicle hatch door. The vehicle hatch door can be mounted on the body component by means of a pneumatic spring hinged by connection elements movably power-assisted on a pivoting axis. The hatch door closes the trunk, whereby an additional component, as for example, an additional component designed as a trunk compartment cover, would prevent one from seeing inside the trunk.

During the opening and/or closing motion of the additional body component (e.g. the hatch door), the additional component, (e.g. the trunk compartment cover) can engage essentially simultaneously in a generally pivoting motion so as to make access to the trunk easier. In order for the trunk compartment cover to move substantially simultaneously with the hatch door, there can be a connection between these two components, i.e., the hatch door and the trunk compartment cover, which connection can relatively frequently be a simple cord. The cord can be removed from either one of the two connected components, whereby the trunk compartment cover can remain closed at all times.

To connect the cord, the hatch door can have at least one fastening point. The fastening point can include a bolt which can be screwed or threaded, for example, into the hatch door. The bolt can reach through the hatch door inner lining so that during the assembly of the hatch door, the opening in its inner lining has to be aligned with the threaded opening on the hatch door. In addition, a safeguard must generally be provided to prevent the bolt from loosening by itself.

OBJECT OF THE INVENTION

The object of the present invention is to solve the known problems relating to movable body parts which engage with at least one other movable component.

SUMMARY OF THE INVENTION

According to the present invention, the object can be achieved by connecting the additional component (for example, the trunk compartment cover) to the pneumatic spring assembly.

In a preferred embodiment, there can be no need to use a separately screwed-in or tension-mounted bolt as part of the connection. Simply using the pneumatic spring as a connection point can eliminate the bolt and the bolt's possibly time-consuming installation.

In order to avoid the use of welded components on the cylinder of the pneumatic spring, the additional component (for example, the trunk compartment cover) can be connected by means of a connection element on the pneumatic spring. One possible embodiment of the present invention specifies that the connection element have a bearing head connected to a safety bracket. The safety bracket can hold from behind a connection bearing whereby the safety bracket has a receptacle for the connection. Alternatively, the connection element can include a bearing head, that, in possible embodiments of the present invention, does not include a safety bracket. The bearing head can act together with a connection bearing in which case the bearing head can include a receptacle for the connection.

In yet another embodiment of the present invention, the receptacle can be designed as a mushroom-shaped pin. Conversely, the receptacle can be designed as a slot inside a bar or as an angled hook. An advantage of all the design variations notably can be that, essentially, no additional component has to be mounted on the pneumatic spring. Moreover, in a further embodiment of the present invention, there can be the possibility that the already existing component of the pneumatic spring can be adapted with minimal technical effort. The pneumatic spring practically takes over an additional function during the movement of the hatch door. In other words, the pneumatic spring can continue in its original function to assist in moving the hatch door, but can also be connected to the additional component to assist in moving the additional component.

It is also possible, in a further variant embodiment of the present invention, that the connection element can include a bearing pin. The bearing pin can have a longitudinal section for the connection. There essentially would be no need for any adjustments to the pneumatic spring itself. To make the connection, one can simply attach the cord to the bearing pin located either on the side of the vehicle body or on the side of the additional component.

In an alternative embodiment of the present invention, a sleeve can have a receptacle for the connection. The sleeve can be slid up, or be positioned or assembled along, the cylinder of the pneumatic spring. The sleeve can have the advantage in that the receptacle on the pneumatic spring can be modified or adjusted, for example, to take into account installation tolerances or various installation arrangements in a multitude of vehicles.

In the case of embodiments of the present invention for use with relatively large or heavy components, which relatively large or heavy components are to be moved simultaneously by means of the connection, it can be specified that the sleeve preferably be thimble-shaped and can be supported on the frontal side of the cylinder.

To prevent the connection from being jammed or sheared off in the closed position of the additional body part, as for example, with the hatch door closed, the body component and/or additional body part can have a recess or gutter to facilitate the connection.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintain that this application may include more than one patentably and non-obviously distinct invention. The Applicants hereby assert that the disclosure of event that there is more than one invention, that these inventions may be patentable and non-obvious with respect to the other.

BRIEF DESCRIPTION OF THE DRAWINGS

The present invention will be explained in more detail based on the following description of the drawings, in which.

DESCRIPTION OF THE PREFERRED EMBODIMENT

Figure 1:
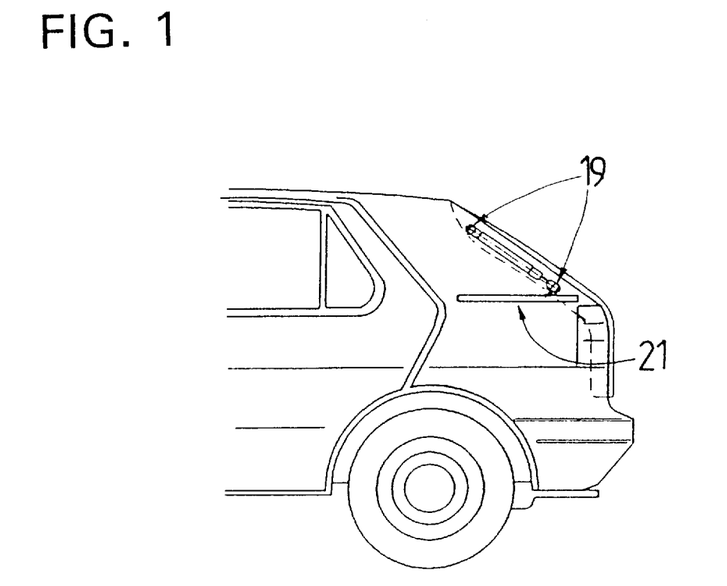
FIG. 1 illustrates a side view of the rear end of a motor vehicle with a possible installation arrangement of the pneumatic spring when used in a vehicle hatch door, the vehicle hatch door being closed.
Figure 1A:
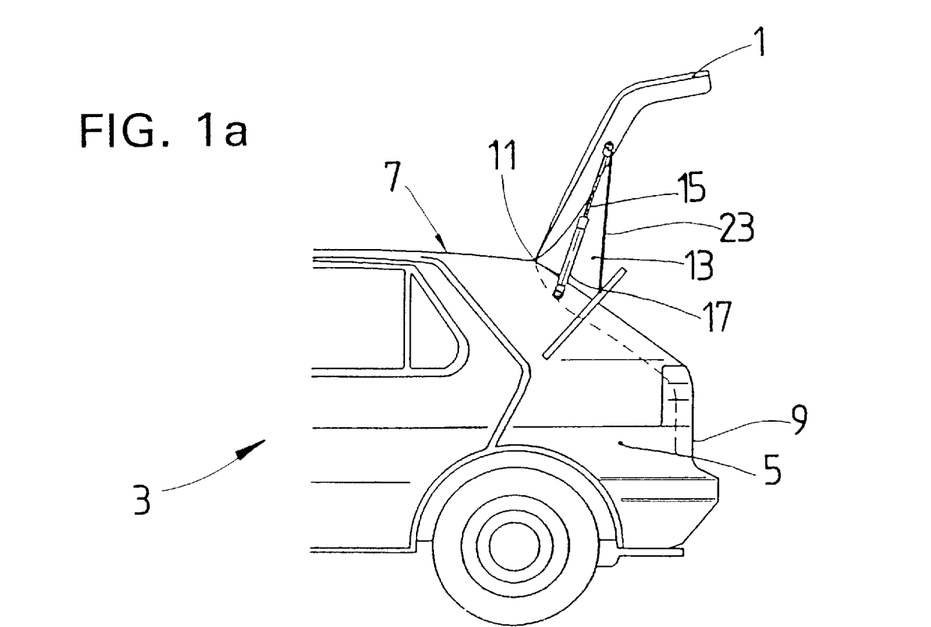
FIG. 1a is a side view similar to FIG. 1, the vehicle hatch door being open.

FIG. 1a shows a side view of the rear end of a vehicle having a hatch door 1. The vehicle can include a vehicle body 3, and the vehicle body 3 can have a rear fender 5, a roof 7, and a closing apron 9 as body components. In relation to the vehicle body 3 and the other body components, the hatch door 1 can preferably be designed as a moveable component, the hatch door 1 moving on a pivoting axis 11. The pivoting axis 11 can extend crosswise to the longitudinal axis of the vehicle where, for the purposes of power assistance, there preferably can be at least one pneumatic spring 13. The pneumatic spring 13 can be attached to the vehicle body 3 and on the hatch door 1. It is assumed that the construction of the pneumatic spring 13 is commonly known. It should be recognized that other types of springs or power assist devices, e.g. gas springs or magnetic devices, can also be used to assist in opening the hatch door 1 for variant embodiments of the present invention.

Essential components of the pneumatic spring 13 can include a piston rod 15, one end of which piston rod 15 can protrude from a cylinder 17 of the pneumatic spring 13. The piston rod 15 can be designed to be axially movable in relation to the cylinder 17. A gas, preferably filling in or enclosed within the cylinder 17, can make a working pressure available. The working pressure can have a thrusting effect on the piston rod 15. Additionally, reference is made to various building types and application examples, as in German Laid Open Patent Application No. 23 32 791, German Laid Open Patent Application No. 23 45 503 or German Laid Open Patent Application No. 24 57 938. As shown in FIG. 1, the pneumatic spring 13 can be held by connection elements 19, with each connection element 19 preferably mounted on an end of the pneumatic spring 19. In this context reference is made to the embodiments in German Laid Open Patent Application No. 29 54 560.

In the case of a pivot motion of the hatch door 1 from a closed position (illustrated in FIG. 1) to an open position (illustrated in FIG. 1a), an additional component 21, which additional component 21,can preferably be realized as a trunk compartment cover 21 as shown in FIG. 1, can move from a substantially horizontal position to an angled position. For this purpose, there can be a connection 23 between the hatch door 1 and the trunk compartment cover 21. The connection 23 can preferably be made by means of a strap or cord. Generally, the connection 23 can be detached, so that depending on the user's needs, the hatch door 1 can be opened without opening the trunk compartment cover 21.

To simplify the installation effort, according to the present invention, there can be a connection 23 between the pneumatic spring 13 and the trunk compartment cover 21. For this purpose, according to different possible embodiments of the present invention, the pneumatic spring 13 can include various types of receptacles 19, which receptacles 19 are illustrated further in FIGS. 2, 2a, 3, 3a, 4, 4a, 5, 5a and 6.

FIGS. 2, 2a, 3 and 3a show the connection element 19 having the structural shape of a ball socket pan, which ball socket pan can be set on a ball pin (not shown) on the body side. German Laid Open Patent Application No. 29 54 560 describes in great detail this type of ball socket assembly; the content of this publication is assumed to be known and is incorporated by reference herein.

In other words, in possible embodiments of the present invention, one or both ends of the pneumatic spring 13 can be attached to the respective hatch door 1 and/or vehicle body 3 by means of a ball-and-socket joint. The end of the pneumatic spring 13 can be formed to make up either the ball or the socket of the ball and socket joint. The respective matching socket or ball of the ball-and-socket joint can be attached to the corresponding door hatch 1 or vehicle body 3. Ball-and-socket joints are known methods of positioning one component with respect to another component, yet allowing relative pivoting or rotation of the components about the ball of the ball-and-socket joint. It should be recognized however that in other embodiments of the present invention, other known methods of attachment, or other rotational attachments, can be used that can allow a relative rotation at the attachment point between the two components to be attached.

Figure 2:
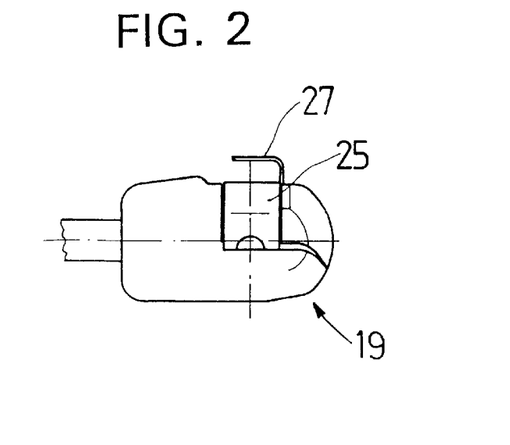
FIGS. 2, 2a and 2b illustrate orthogonal views of one embodiment of a connection to the pneumatic spring.
Figure 2A:
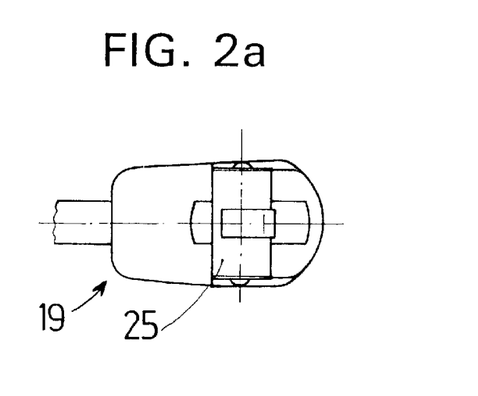
Figure 2B:
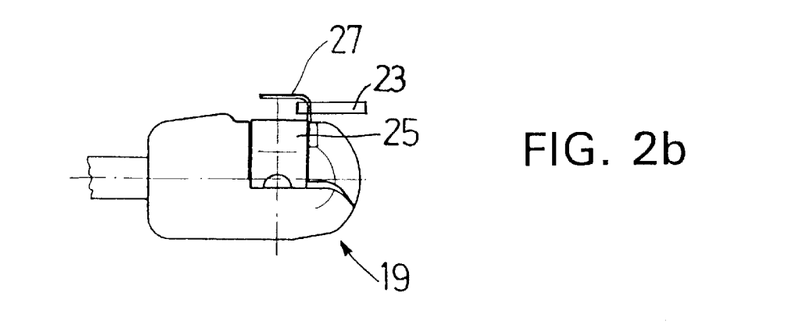

An essential component of the embodiments of the connection element 19 illustrated in FIGS. 2 and 2a is a safety bracket 25. The safety bracket 25 can consist of a simple sheet metal strip. The safety bracket 25 can have a receptacle 27, preferably designed as an angled holding hook 27, which can be a component of the safety bracket 25. The cord or strap of the connection 23 (see FIG. 1a) can be simply pushed over the angled holding hook or receptacle 27 to create the connection 23 between the hatch door 1 and the trunk cover lid 21. FIG. 2b shows, in a block diagram, the connection 23 interacting with the receptacle 27.

Figure 3:
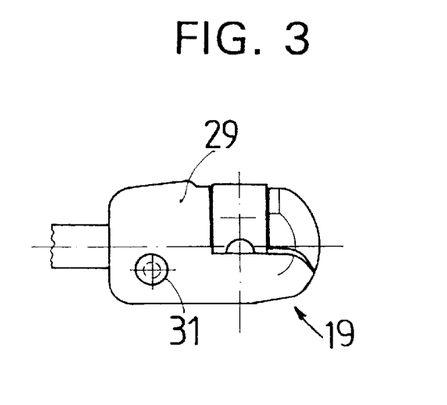
FIGS. 3 and 3a illustrate orthogonal views of a second embodiment of a connection to the pneumatic spring.
Figure 3A:
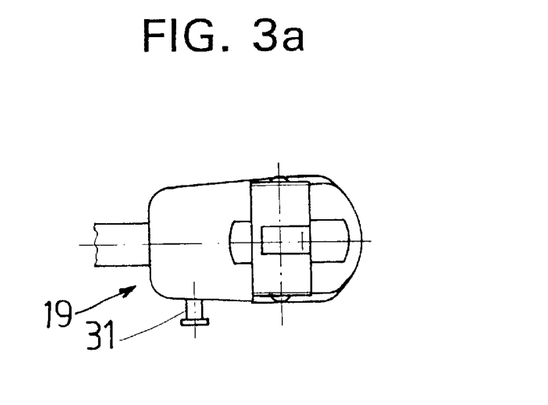

The embodiment of the connection element 19 illustrated in FIGS. 3 and 3a is similar to the embodiment shown in FIGS. 2 and 2a. A bearing head 29 of the connection element 19 can have a receptacle preferably having a mushroom-shaped pin 31.

This mushroom-shaped receptacle, or mushroom-shaped pin 31, can allow for a relatively simple eye, strap or cord, as part of the connection 23, for the fastening.

Figure 4:
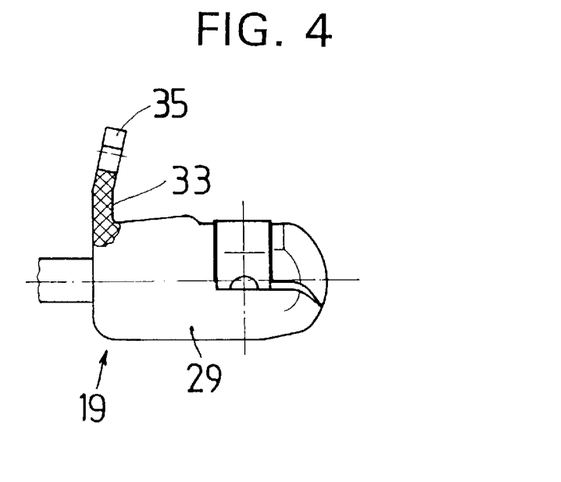
FIGS. 4 and 4a illustrate orthogonal views of a third embodiment of a connection to the pneumatic spring.
Figure 4A:
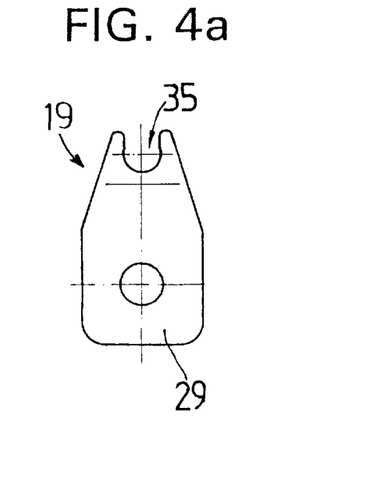
Figure 5:
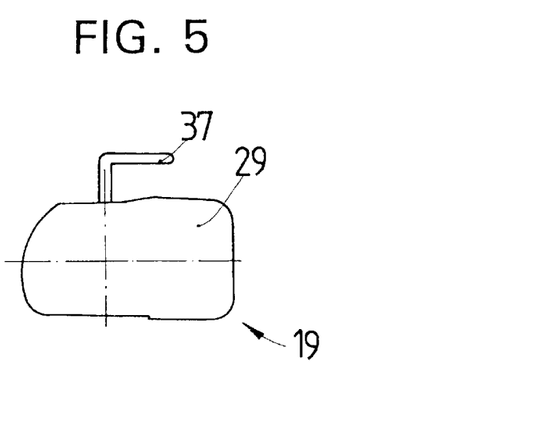
FIGS. 5, 5a and 5b illustrate orthogonal views of a fourth embodiment of a connection to the pneumatic spring.
Figure 5A:
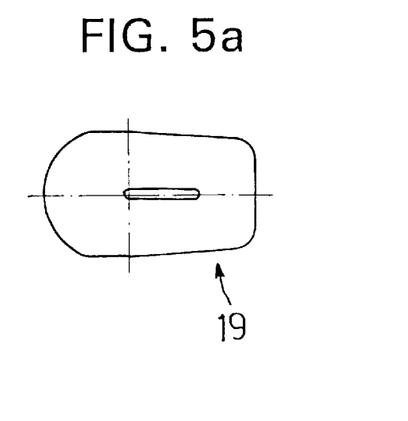
Figure 5B:
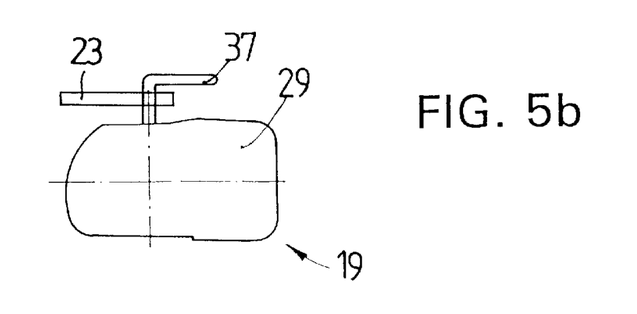

The embodiment of the connection element 19 illustrated in FIGS. 4 and 4a can include a bar 33 as part of the bearing head 29. The bar 33 can have a slot 35 into which the connection 23 can be retracted. In FIGS. 5 and 5a, another embodiment of the connection element 19, similar to the embodiment shown in FIGS. 2 and 2a, is shown. The connection element 19 can include an angled hook 37. The angled hook 37 can preferably be designed as one piece with the bearing head 29. FIG. 5b shows, in a block diagram, the connection 23 interacting with the angled hook 37.

All variations, or embodiments of the connection element 19, illustrated in FIGS. 2, 2a, 3, 3a, 4, 4a, 5 and 5a can be mounted essentially anywhere on either the piston rod 15 or on the cylinder 17 of the pneumatic spring 13.

In other words, the connection element 19 can be mounted on either end of the pneumatic spring 13, including the end adjacent the piston rod 15 or the end adjacent the cylinder 17.

Figure 6:
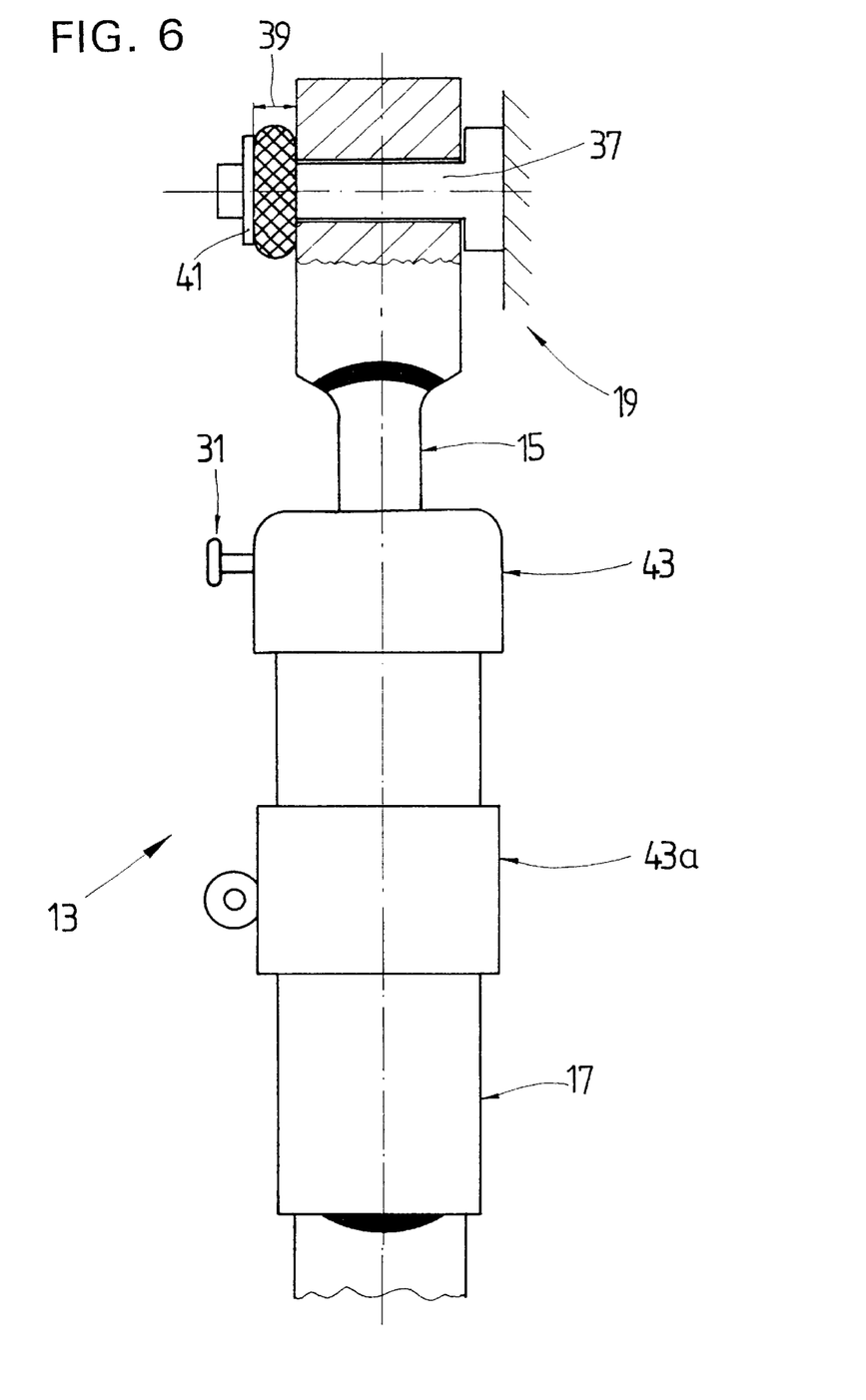
FIG. 6 includes a partial cross sectional view of a fifth embodiment of a connection to the pneumatic spring.

FIG. 6 illustrates another possible embodiment of the present invention. FIG. 6 shows the pneumatic spring 13 can have the connection element 19 separate from the vehicle. FIG. 6 illustrates several possible embodiments of the present invention. Thus it can be specified in a possible embodiment of the present invention, that a bearing pin 37 can be part of the connection element 19. The bearing pin 37 can have a longitudinal section 39, which longitudinal section 39 can be used to attach the connection 23. A safety ring 41 can essentially ensure the axial safety of the connection 23 and pneumatic spring 13.

Another possible embodiment of the present invention is further illustrated in FIG. 6. A sleeve 43a can be slid over the cylinder 17. The sleeve 43a can be kept in its place relative to the cylinder 17 preferably by the stress-conditioned friction between cylinder 17 and sleeve 43a. The friction can be calculated so that the weight of the component (for example, the trunk lid cover 21 illustrated in FIG. 1) to be moved would not cause a change in position; however a manual adjustment during installation can be possible.

In other words, sleeve 43a can be attached to the cylinder 17 by an attachment means that can generate sufficient friction between cylinder 17 and sleeve 43a to prevent relative motion between the sleeve 43a and the cylinder 17 during use. However, the attachment means, or frictional engagement between the sleeve 43a and the cylinder 17 preferably would not generate such high frictional forces so as to prevent relative motion between the sleeve 43a and the cylinder 17 during installation. For example, an installation tool might apply sufficient force to overcome friction and allow the sleeve 43a to slide to an installed position along the cylinder 17. Or sleeve 43a can be heated to a sufficient temperature to allow the sleeve 43a to slide freely along the cylinder 17; subsequent cooling of the sleeve 43a can allow the sleeve 43a to grab or frictionally engage the cylinder 17 for subsequent operation. Examples of some attachment means that could possibly be adapted for use in the context of the present invention could include force-fitting, shrink-fitting, heat shrinking (including heating one component, or cooling another component, or a combination of heating and cooling of components to allow assembly), and interference fitting.

On the sleeve 43a, essentially any type of embodiment for the receptacle or connection 19 can exist, such as, for example, the individual embodiments of the connection 19 previously described in FIGS. 2, 2a, 3, 3a, 4, 4a, 5 and 5a. The embodiment of sleeve 43a illustrated in FIG. 6 has an eye as a receptacle.

Yet another possible embodiment of the present invention is further illustrated in FIG. 6. For particularly heavy components to be moved, it can be advantageous that the sleeve (shown as sleeve 43 in FIG. 6) be designed in the shape of a thimble and be supported at the end of the cylinder 17. For the embodiment of sleeve 43 illustrated in FIG. 6, the receptacle is designed as a mushroom-shaped pin 31 and is similar to the connection embodiments shown in FIGS. 3 and 3a.

In other words, the sleeve 43 can fit over an end of the cylinder 17. Mechanical obstruction between the sleeve 43 and the cylinder 17 can prevent the sleeve, 43 from moving towards an opposite end of the cylinder 17. This can be advantageous under relatively high loading, wherein the frictional forces resisting relative movement between the sleeve (as embodied as. sleeve 43a) and the cylinder 17 might be overcome by the relatively high weight or force or load applied to the sleeve 43a. Therefore, in possible embodiments of the present invention, friction between the sleeve (as embodied as sleeve 43) and the cylinder 17 would not be essentially the sole means for preventing relative motion between the sleeve 43 and the cylinder 17. The mechanical obstruction, or positive engagement, between the sleeve 43 and the end of the cylinder 17 thereby can allow relatively higher weight or load or force to be applied to the sleeve 43 than might otherwise be possible for the sleeve as embodied as sleeve 43a.

To fit over the end of the cylinder 17, the sleeve 43 can be thimble-shaped. In other possible embodiments of the present invention, the sleeve 43 can be cup-shaped, or cylindrically shaped, or can include a tubular portion or flange portion to engage the end of the cylinder 17.

Figure 7:
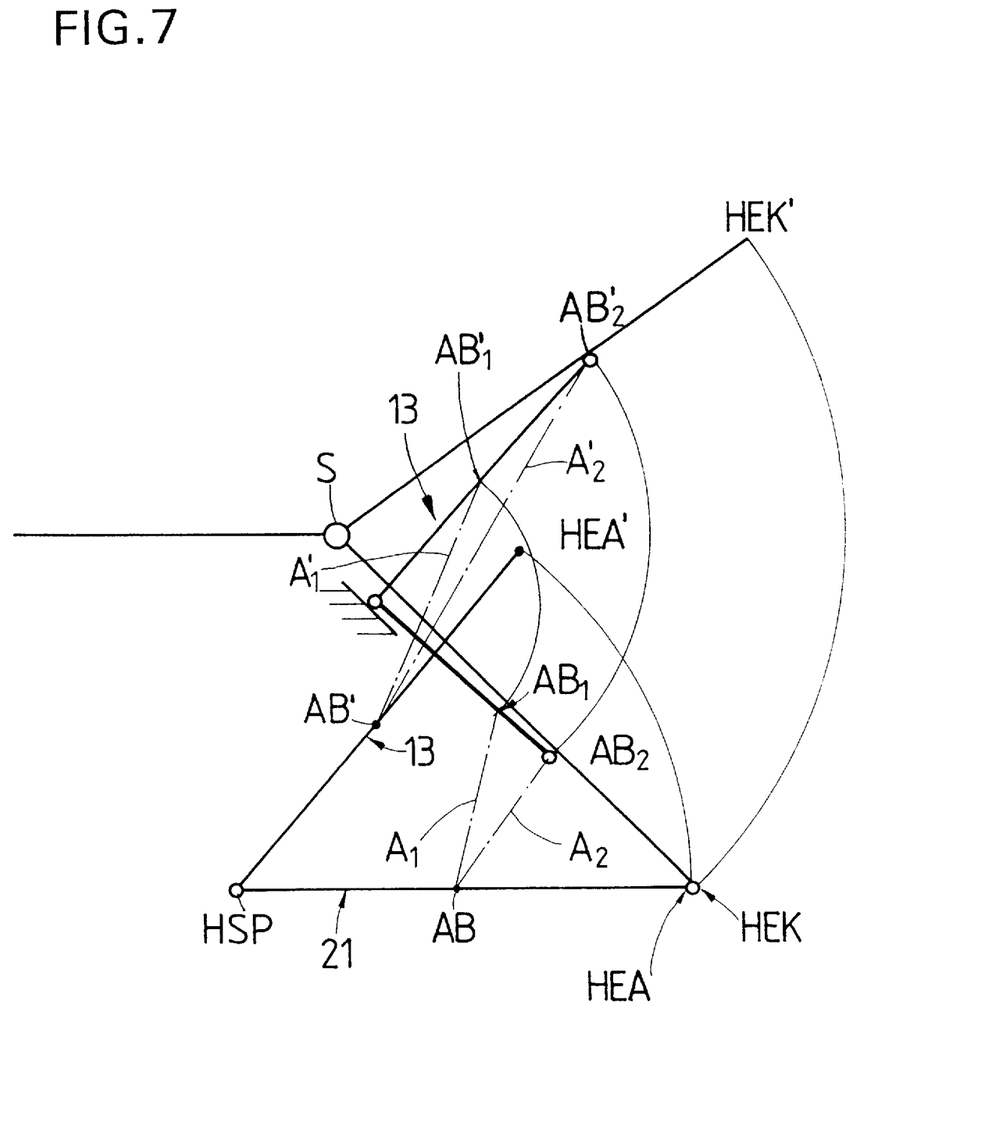
FIG. 7 is a schematic view of a motion sequence of a hatch door and a trunk compartment cover of a vehicle.

FIG. 7 illustrates the motion sequence of the individual components. The hatch door 1 pivots around point S which represents the pivoting axis. An end point HEK of the hatch door 1 can move to an apex point HEK'. The trunk compartment cover as additional component 21 can turn around a point HSP by means of connections $A_1$ and $A_2$. Thus the end point HEA of the trunk compartment cover 21 can move to a final position HEA'. The motion of the hatch door 1 and the trunk compartment cover 21 can be supported by the pneumatic spring 13, whose piston rod 15 can extend out of the cylinder 17.

In other words, the hatch door 1 can pivot about point S, which point S can correspond to the pivoting axis 11 shown in FIG. 1a. Point HEK represents the location of an end of the hatch door 1, away from the pivot point S, when the hatch door 1 is in its closed position. To open the hatch door 1, the hatch door 1 can pivot or rotate (in a counterclockwise direction as viewed in FIG. 7) about point S. The point HEK' represents the location of the end of the hatch door 1 when the hatch door 1 is in the fully opened position. The end of the hatch door 1 can be seen to sweep an arc essentially centered about point S and extending from HEK to HEK' during an opening movement of the hatch door 1.

As discussed above, to assist the opening of the hatch door 1, one or more pneumatic springs 13 can be hinge-mounted to form a pneumatic spring assembly between the hatch door 1 and the body component. Such a hinge-mounting can preferably include a ball-and-socket joint. An end of the pneumatic spring 13 can be hinge-mounted to the body component. Point $P_1$ (see FIG. 7a) represents this first end of the pneumatic spring 13 hinge-mounted to the body component, and also represents the pivot axis $P_1$ of that end of the pneumatic spring 13. Point $P_2$ (see FIG. 7a) represents the opposite end, or second end, of the pneumatic spring 13 hinge-mounted to the hatch door 1 with the hatch door 1 in the closed position. As the hatch door 1 opens, the point $P_2$ of the pneumatic spring 13 can rotate about point $P_1$ in cooperation with the rotation of the hatch door about point S. Point $P_2'$ (see FIG. 7a) represents the location of the second end of the pneumatic spring 13 with the hatch door 1 in the fully opened position. The second end of the pneumatic spring 13 can be seen to sweep an arc essentially centered about point $P_1$ and extending from $P_2$ to $P_2'$ during an opening movement of the hatch door 1 (see FIG. 7a). The location of the pneumatic spring 13 with the hatch door 1 in the fully opened position can be represented by 13' (see FIG. 7a).

Figure 7A:
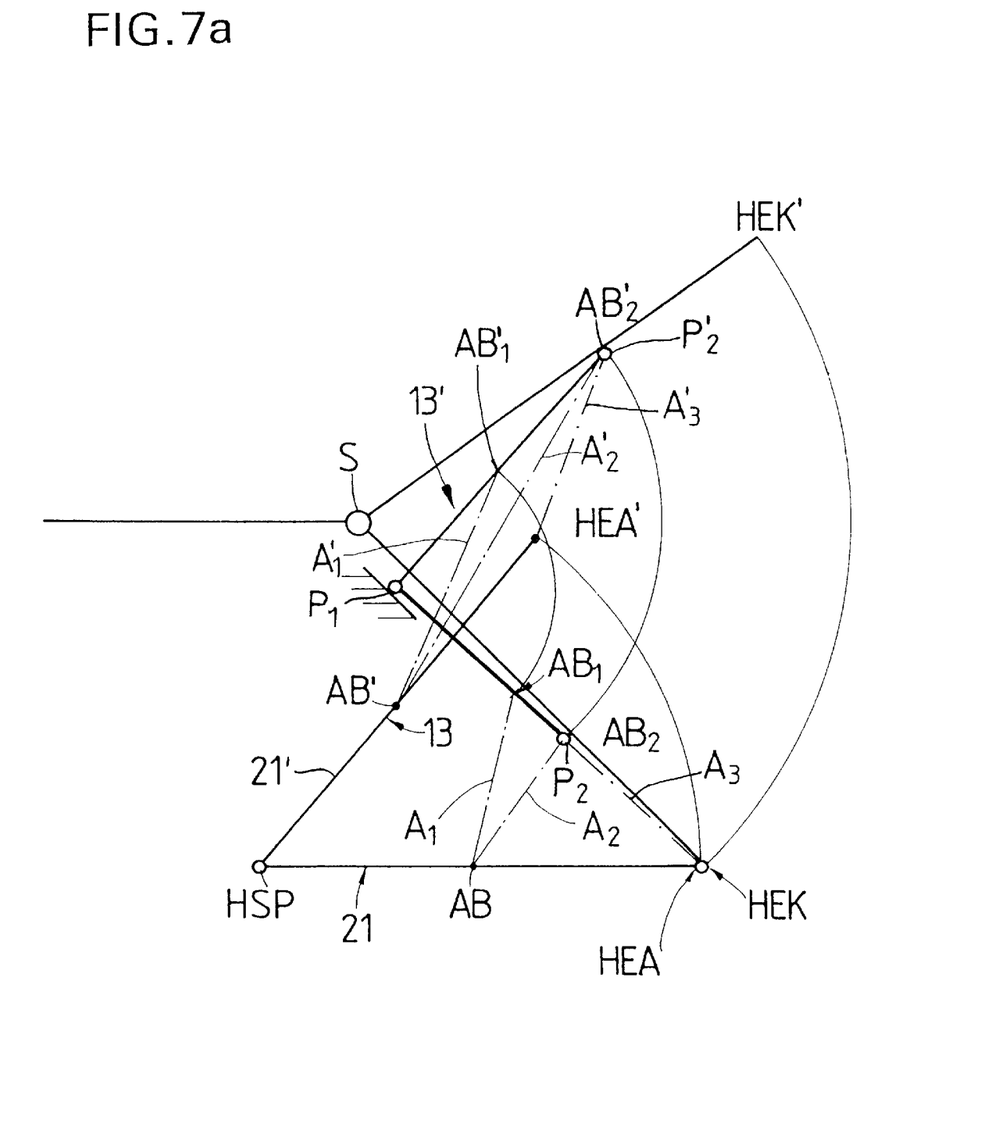
FIG. 7a is similar to FIG. 7 and illustrates an additional connection between a hatch door and a trunk compartment cover of a vehicle.

The trunk compartment cover 21 can also rotate, to a position represented as 21' in FIG. 7a, about an axis of rotation located at an end of the trunk compartment cover 21 to allow access to the trunk (not shown) when the hatch door 1 is in its opened position. This axis of rotation is represented as point HSP, which in the embodiment illustrated in FIG. 7, is located along an end of the trunk compartment cover 21. To permit the trunk compartment cover 21 to rotate about point HSP in cooperation with the opening of the hatch door 1, the trunk compartment cover 21 can be connected, via connection 23 as shown in FIG. 1 and represented as $A_1$ or $A_2$ in FIG. 7, to the pneumatic spring 13 as discussed above. An attachment of the connection 23 located on the trunk compartment cover 21 can be represented as point AB, which shows a location of the attachment to the trunk compartment cover 21 with the hatch door 1 in a closed position.

In some embodiments of the pneumatic spring 13 (see e.g., FIGS. 2–5), the other attachment of the connection 23, located at the pneumatic spring 13, can be located essentially at an end of the pneumatic spring 13. This possible attachment point can be represented by point $AB_2$, which shows a possible location of the attachment to the pneumatic spring 21 with the hatch door 1 in a closed position. In other embodiments of the pneumatic spring 13 (see e.g., FIG. 6 with sleeve 43a), the attachment to the pneumatic spring 13 can be located a substantial distance from the end $P_2$ of the pneumatic spring 13. Such an alternative attachment point can be represented by point $AB_1$, which shows a possible location of the attachment-to the pneumatic spring 13 with the hatch door 1 in a closed position.

FIG. 7 therefore illustrates two possible embodiments of the connection 23. A first embodiment of the connection 23, represented as $A_1$ when the hatch door 1 is closed, has an attachment point AB on the trunk compartment cover 21 and an attachment point $AB_1$ on the pneumatic spring 13. The attachment point $AB_1$ is located a substantial distance from the end $P_2$ of the pneumatic spring 13. A second embodiment of the connection 23, represented as A2 when the hatch door 1 is closed, also has the attachment point AB on the trunk compartment cover 21 and an attachment point $AB_2$ on the pneumatic spring 13. The attachment point A2 is essentially located at the end $P_2$ of the pneumatic spring 13. Each embodiment $A_1$ and $A_2$ of the connection 23 is also shown as corresponding connections $A_1'$ and $A_2'$ with the hatch door 1 in the fully open position.

FIG. 7 also illustrates the influence of the connection point AB in relation to connection points $AB_1$ and $AB_2$ of the two embodiments $A_1$ and $A_2$ of the connection 23. By using the connection element 19 for a connection 23 (see FIG. 1), the ideal connection point AB can correspond to the end point of the trunk compartment cover HEA. A comparison of the length of the connection $A_2$ between connection point AB and connection point $AB_2$ of the connection element clearly shows this fact. Connection $A_1$ or $A_1'$ indicates the connection to the cylinder of the pneumatic spring 13 or 13' for the open position of the hatch door.

In other words, the connection 23, embodied as connection $A_1$ in FIG. 7, extends from attachment point $AB_1$ to attachment point AB when the hatch door 1 is closed. $A_1$ can represent the distance, or length of connection 23, between attachment points $AB_1$ and AB. When the hatch door 1 is fully open, the connection $A_1$ is displaced as shown to connection $A_1'$. The connection $A_1'$ extends from attachment point $AB_1'$ to attachment point AB' when the hatch door 1 is fully opened. $A_1'$ can represent the distance, or length of connection 23, between attachment points $AB_1'$ and AB'. As shown in FIG. 7, the difference in lengths $A_1$ and $A_1'$ represents a stretching of the connection 23.

Similarly, the connection 23, embodied as connection $A_2$ in FIG. 7, extends from attachment point $AB_2$ to attachment point AB when the hatch door 1 is closed. $A_2$ can represent the distance, or length of connection 23, between attachment points $AB_2$ and AB. When the hatch door 1 is fully open, the connection A2 is displaced as shown to connection A2'. The connection A2' extends from attachment point $AB_2'$ to attachment point AB' when the hatch door 1 is fully opened. $A_2'$ can represent the distance, or length of connection 23, between attachment points $AB_2'$ and AB'. As shown in FIG. 7, the difference in lengths A2 and $A_2'$ also represents a stretching of the connection 23. These various distances $A_1$, $A_2$, $A_1'$ and $A_2'$ can be selected, for various embodiments of the present invention, to meet specific mechanical or material requirements, by varying the location of the attachment point AB on the trunk compartment cover 21, or by varying the location of the attachment point, e.g., $AB_1$ or $AB_2$, on the pneumatic spring 13.

FIG. 7a illustrates a third possible embodiment of the connection 23, represented as $A_3$, with the door hatch 1 closed. The connection $A_3$ extends from attachment $AB_2$ to attachment HEA, the end point of the trunk compartment cover 21. $A_3$ can represent the distance, or the length of the connection 23, between attachment points $AB_2$ and HEA. With the hatch door 1 fully opened, connection $A_3$ is displaced to connection $A_3'$. Connection $A_3'$ extends from attachment point $AB_2'$ to attachment point HEA'. A3' can represent the distance, or the length of the connection 23, between attachment points $AB_2'$ and HEA'. As shown in FIG. 7a, the length $A_3$ is essentially equal to $A_3'$, indicating little or no stretching of the connection 23 in this specimen embodiment.

Figure 8:
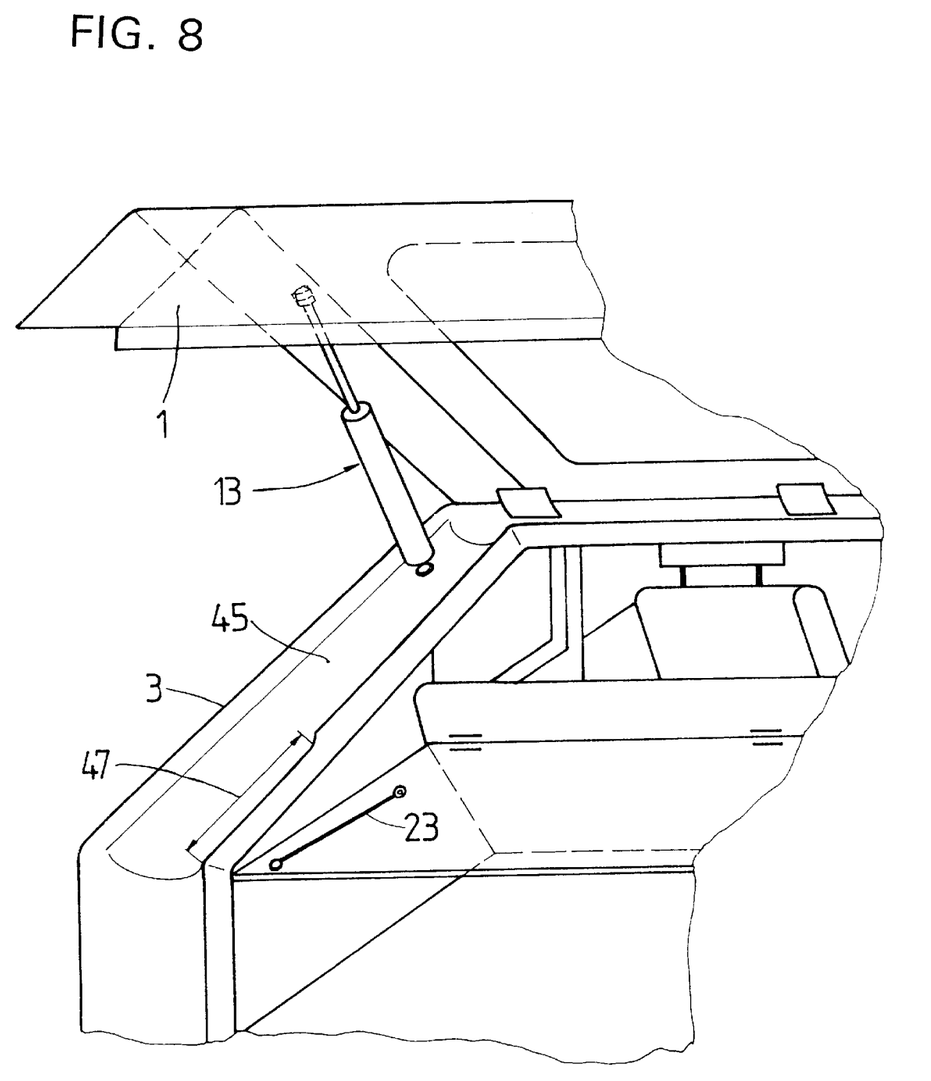
FIG. 8 is a pictorial view of a pneumatic spring assembly of the vehicle illustrated in FIG. 1.

FIG. 8 shows the vehicle from FIG. 1 with an open hatch door 1 from a perspective view so as to show the installation of the pneumatic spring 13 on the body 3. In the case of pneumatic springs 13 installed inside the body 3, the connection 23 can move freely with the pivoting motion of the body component 21, i.e., the trunk compartment cover 21. Sometimes the pneumatic springs 13 are installed inside a rain gutter or gutter or recess 45 of the body 3. The gutter 45 is distinctively shaped so that the pneumatic spring 13 does not run parallel to the hatch door 1, even in the closed hatch door position (illustrated in FIG. 1). Otherwise, there may be essentially no lever length provided to enhance the thrust of the pneumatic spring 13 at the time of opening (in other words, otherwise the force applied by the pneumatic spring 13 would essentially be parallel with the hatch door 1, and would not act to generate a force directed to produce torque to assist in pivoting the hatch door 1 to open). If the pneumatic spring 13 is mounted in the rain gutter 45, the connection 23 must be kept from jamming or being sheared off in the closed position of the hatch door 1. To this end, there can be a recess 47 provided in the body 3 of the vehicle so that the mobility of the connection 23 is ensured. Of course, the recess 47 can, in a variant embodiment of the present invention, also be incorporated into the hatch door 1.

FIG. 8 also illustrates that the connection 23 can be broken by removing the connection to the pneumatic spring 13 to prevent opening of the trunk compartment cover 21 with the opening of the hatch door 1.

One feature of the present invention resides broadly in the vehicle comprising a body component, an additional body part particularly a hatch door which is movably mounted on the body component on a power- assisted pivoting axis by means of a pneumatic spring hinged by connection elements, whereby the pneumatic spring and the connection elements form a pneumatic spring assembly, and the vehicle has a component which moves by means of a connection, at least incrementally, simultaneously with each movement of the additional body part characterized in that the connection 23 is made between the component 21 and the pneumatic spring assembly 13, 15, 17, 19, 37, 43.

Another feature of the invention resides broadly in the vehicle characterized in that the connection 23 of the component 21 is made through one of the connection elements 19 of the pneumatic spring 13.

Yet another feature of the invention resides broadly in the vehicle characterized in that the connection element 19 comprises a bearing head 29 connected to a safety bracket 25, said bracket holding from behind a connection bearing, whereby the safety bracket 25 has a receptacle 27 for the connection 23.

Still another feature of the invention resides broadly in the vehicle characterized in that the connection element 19 has a bearing head 29 that works in combination with a connection bearing, whereby the bearing head 29 has a receptacle 23 for the connection.

A further feature of the invention resides broadly in the vehicle characterized in that the receptacle is a mushroom-shaped pin 21.

Another feature of the invention resides broadly in the vehicle characterized in that the receptacle is made as a slot 35 within the bar 33 of the bearing head 25.

Yet another feature of the invention resides broadly in the vehicle characterized in that the receptacle is formed as an angled hook of the bearing head 25.

Still another feature of the invention resides broadly in the vehicle characterized in that the connection element comprises a bearing pin 37 that has a longitudinal section for the connection 23.

A further feature of the invention resides broadly in the vehicle characterized in that a sleeve 43 having a receptacle for the connection 23 is slid onto the cylinder 17 of the pneumatic spring 13. Another feature of the invention resides broadly in the vehicle characterized in that the sleeve 43 is thimble-shaped and is supported on the frontal side of the cylinder 17.

Yet another feature of the invention resides broadly in the vehicle characterized in that the body component 3, 5, 9 and/or the additional body part 1 have a recess 47 whereby the connection 23 is made.

Some examples of vehicle hatchbacks or vehicle liftgates which could possibly be used or which could possibly be adapted for use in the context of the present invention, along with other components generally associated with vehicle hatchbacks or vehicle liftgates could be disclosed by the following U.S. Pat. No. 5,478,126, No. 5,273,327, No. 5,222,775, No. 4,436,336 and No. 4,415,194.

Some examples of ball and socket joints which could possibly be used or which could possibly be adapted for use in the context of the present invention could be disclosed by the following U.S. Pat. No. 5,409,320 (assigned to the assignee of the present invention), No. 5,383,738, No. 5,380,114, No. 5,365,639 and No. 5,265,965.

Some examples of gas springs or pneumatic springs or which could possibly be used or which could possibly be adapted for use in the context of the present invention could be disclosed by the following U.S. Patents, each of which have been assigned to the assignee of the present invention: No. 5,126,925, No. 4,650,165 and No. 4,240,619.

Other examples of gas springs or telescoping components which could possibly be used or which could possibly be adapted for use in the context of the present invention could be disclosed by the following U.S. Pat. No. 5,215,291, No. 5,120,030, No. 4,921,225 and No. 4,744,548.

Some other examples of components generally associated with vehicle hatchbacks or vehicle liftgates could possibly be disclosed by the following U.S. Pat. No. 5,466,036, No. 5,120,030, No. 5,024,303, No. 5,003,136, No. 4,22,601 and No. 4,220,367.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 195 44 590.2, filed on Nov. 30, 1995, having inventors Alfred K. Klein and Peter Thurmann, and DE-OS 195 44 590.2 and DE-PS 195 44 590.2, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A motor vehicle having a first component, a second component movably mounted on said first component and a third component, said motor vehicle comprising:

a strut assembly to position said second component with respect to said first component and to move said third component;

said strut assembly comprising a fluid spring having a longitudinal axis;

said strut assembly comprising a first end portion and an axially opposite second end portion;

said first end portion of said strut assembly being attached to said first component;

said second end portion of said strut assembly being attached to said second component;

said strut assembly being extendable and retractable along the longitudinal axis to position said second component with respect to said first component;

said strut assembly comprising a mechanical connector to mechanically connect said third component to said strut assembly;

said strut assembly comprises a connection member;

said third component being moveable by cooperative action of said mechanical connector and said connection member upon positioning said second component with respect to said first component;

said fluid spring comprising a cylinder assembly;

said cylinder assembly comprising an operating fluid disposed therein;

said first end portion of said strut assembly comprising a first assembly being disposed to pivotally mount said first end portion to said first component of said motor vehicle;

said second end portion of said strut assembly comprising a second assembly being disposed to pivotally mount said second end portion to said second component of said motor vehicle; and one of: said first assembly and said second assembly comprising said mechanical connector.

2. The motor vehicle according to claim 1, wherein:

said one of said first assembly and said second assembly comprises a bearing;

said bearing is fixedly fastened to the corresponding one of said first and second components of said motor vehicle;

said one of said first assembly and said second assembly comprises a bearing head;

said bearing head is pivotally mounted on said bearing; and said mechanical connector is fixedly connected to one of: said bearing and said bearing head.

3. The motor vehicle according to claim 2, wherein:

said connection member is disposed to mechanically connect said mechanical connector with said third component;

said mechanical connector is fixedly connected to said bearing head;

said strut assembly further comprises one of the following sets of characteristics A) and B):

A) said mechanical connector comprises a safety bracket;
   said safety bracket is attached to said bearing head;
   said mechanical connector comprises a receptacle disposed on said safety bracket; and
   said receptacle receives said connection member; and
   B) said mechanical connector is mounted to said bearing head.

4. The motor vehicle according to claim 3, wherein:

said second component of said motor vehicle is pivotally mounted on said first component of said motor vehicle;

said operating fluid of said cylinder assembly comprises air;

said one of said sets of characteristics A) and B) comprises said set of characteristics B); and said mechanical connector comprises one of the following sets of characteristics C), D) and E):

C) said mechanical connector comprises a pin;
   said pin extends away from the remainder of said bearing head;
   said pin is mushroom-shaped; and
   said mushroom-shaped pin is attached to said connection member; and
   D) said mechanical connector comprises a bar;
   said bar extends away from the remainder of said bearing head;
   said bar comprises a slot to receive said connection member; and
   said slot extends through said bar; and
   E) said mechanical connector comprises a hook;
   said hook is angle shaped;
   said hook is attached to and extends from the remainder of said bearing head; and
   said connection member is attached to said hook.

5. The motor vehicle according to claim 2, wherein:

said operating fluid comprises air;
   said bearing comprises a pin having a longitudinal axis;
   said pin comprises a longitudinal portion; and
   said mechanical connector comprises said longitudinal portion of said pin.

6. A strut assembly for permitting the moving and positioning of a movable first object with respect to a second object and the moving of a third object, said strut assembly comprising:

a fluid spring having a longitudinal axis;

a first end portion and an axially opposite second end portion;

said first end portion being configured to be attached to the first object;

said second end portion being configured to be attached to the second object;

said strut assembly being extendable and retractable along the longitudinal axis to position said second object with respect to the first object;

a mechanical connector to mechanically connect the third object to said strut assembly;

said mechanical connector moves the third object upon positioning the second object with respect to the first object;

said fluid spring comprising a cylinder assembly;

said cylinder assembly comprising a working fluid disposed therein;

one of: said cylinder assembly, said first end portion of said strut assembly and said second end portion of said strut assembly comprising said mechanical connector;

said first end portion of said strut assembly comprising a first assembly to pivotally mount said first end portion to the first object;

said second end portion of said strut assembly comprising a second assembly to pivotally mount said second end portion to the second object; and one of: said first assembly and said second assembly comprising said mechanical connector.

7. The strut assembly according to claim 6, wherein:

said one of said first assembly and said second assembly comprises a bearing;

said bearing is configured to be fixedly fastened to the corresponding one of the first object and the second object;

said one of said first assembly and said second assembly comprises a bearing head;

said bearing head is pivotally mounted on said bearing; and said mechanical connector is attached to one of: said bearing and said bearing head.

8. The strut assembly according to claim 7, wherein:

said mechanical connector is attached to said bearing head;

said strut assembly further comprises one of the following sets of characteristics A) and B):
 A) said one of said first assembly and said second assembly comprises a safety bracket;
   said safety bracket is attached to said bearing head; and
   said mechanical connector comprises a receptacle disposed on said safety bracket; and
 B) said mechanical connector is mounted to said bearing head.

9. The strut assembly according to claim 8, the first object comprising a first body part of a motor vehicle, the second object comprising a second body part of a motor vehicle, the second body part being movably mounted on the first body part to pivot about a pivoting axis, wherein:

said working fluid comprises air;

said one of said sets of characteristics A) and B) comprises said set of characteristics B); and said mechanical connector comprises one of the following sets of characteristics C), D) and E):
 C) said mechanical connector comprises a pin;
   said pin extends away from the remainder of said bearing head; and
   said pin is mushroom-shaped; and
 D) said mechanical connector comprises a bar; said bar extends away from the remainder of said bearing head;
   said bar comprises a slot to receive and retain a mechanical connection between said strut assembly and the third object;
   said slot extends through said bar; and
 E) said mechanical connector comprises a hook;
   said hook is attached to and extends from the remainder of said bearing head; and said hook is angle shaped.

10. The strut assembly according to claim 7, the first object comprising a first body part of a motor vehicle, the second object comprising a second body part of a motor vehicle, the second body part being movably mounted on the first body part to pivot about a pivoting axis, wherein:

said working fluid comprises air;

said bearing comprises a pin having a longitudinal axis;

said pin comprises a longitudinal portion; and said mechanical connector comprises said longitudinal portion of said pin.

11. A strut assembly, for permitting the moving and positioning of a movable first object with respect to a second object and the moving of a third object, the first object comprising a first body part of a motor vehicle, the second object comprising a second body part of a motor vehicle, the second body part being movably mounted on the first body part to pivot about a pivoting axis, said strut assembly comprising:

a fluid spring having a longitudinal axis;

a first end portion and an axially opposite second end portion;

said first end portion being configured to be attached to the first object;

said second end portion being configured to be attached to the second object;

said strut assembly being extendable and retractable along the longitudinal axis to position said second object with respect to the first object;

a mechanical connector to mechanically connect the third object to said strut assembly;

said mechanical connector moves the third object upon positioning the second object with respect to the first object;

said fluid spring comprising a cylinder assembly;

said cylinder assembly comprising a working fluid disposed therein;

said cylinder assembly comprising said mechanical connector;

said cylinder assembly comprising a cylinder having said working fluid disposed therein;

said mechanical connector comprising a sleeve;

said sleeve being disposed about said cylinder to attach said sleeve and said cylinder with one another;

said sleeve comprising a receptacle;

said working fluid comprising air;

said cylinder comprising a first end and an axially opposite second end;

said mechanical connector being thimble-shaped; and said sleeve of said mechanical connector being mounted on one of: said first end and said second end of said cylinder.

* * * * *